Nov. 25, 1952 E. O. HORN 2,619,209
AUTOMATIC REVERSING CLUTCH
Filed Nov. 12, 1947 4 Sheets-Sheet 1

Inventor:
Edward O. Horn
BY
Harry B. Cook,
Attorney

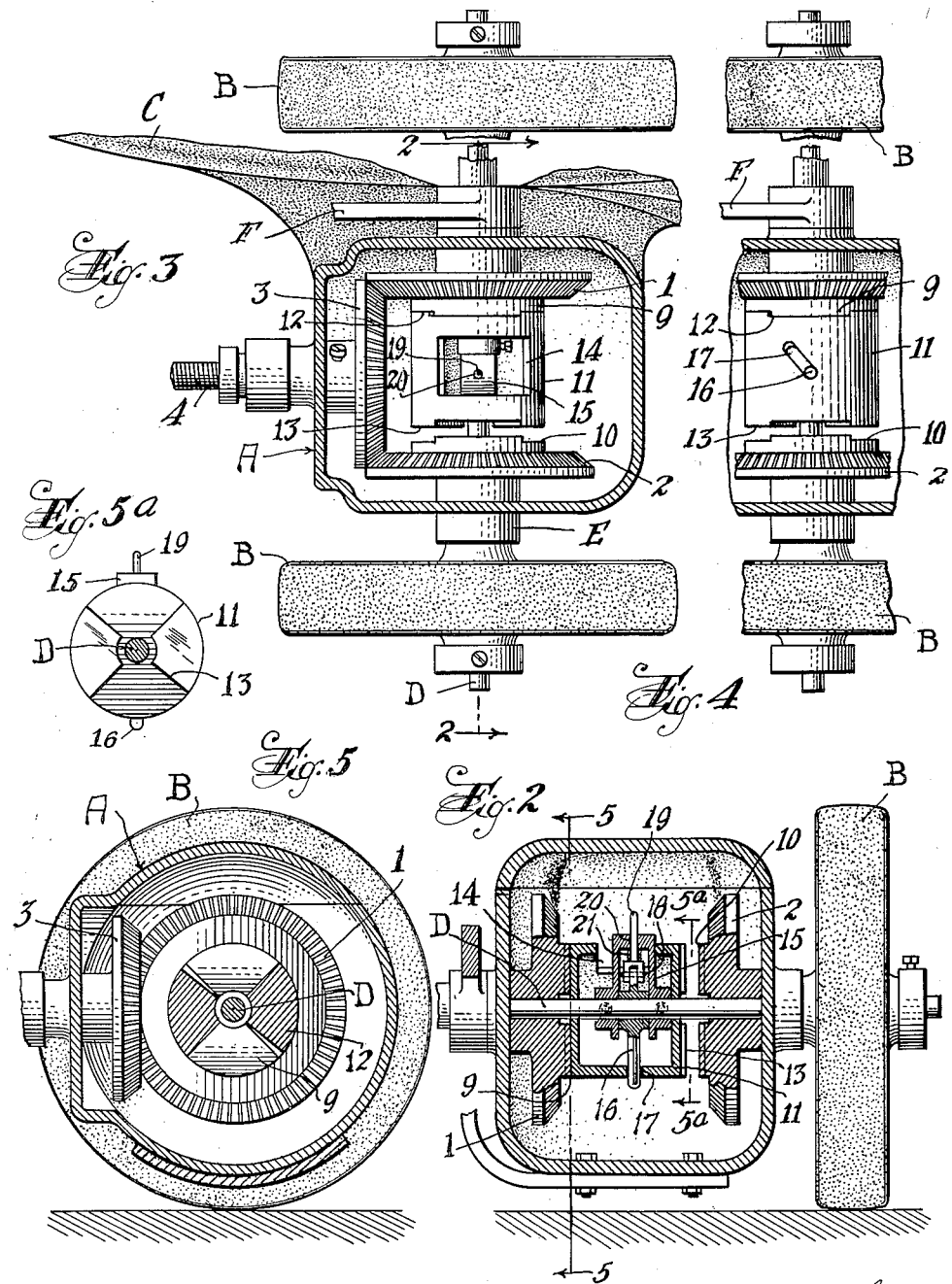

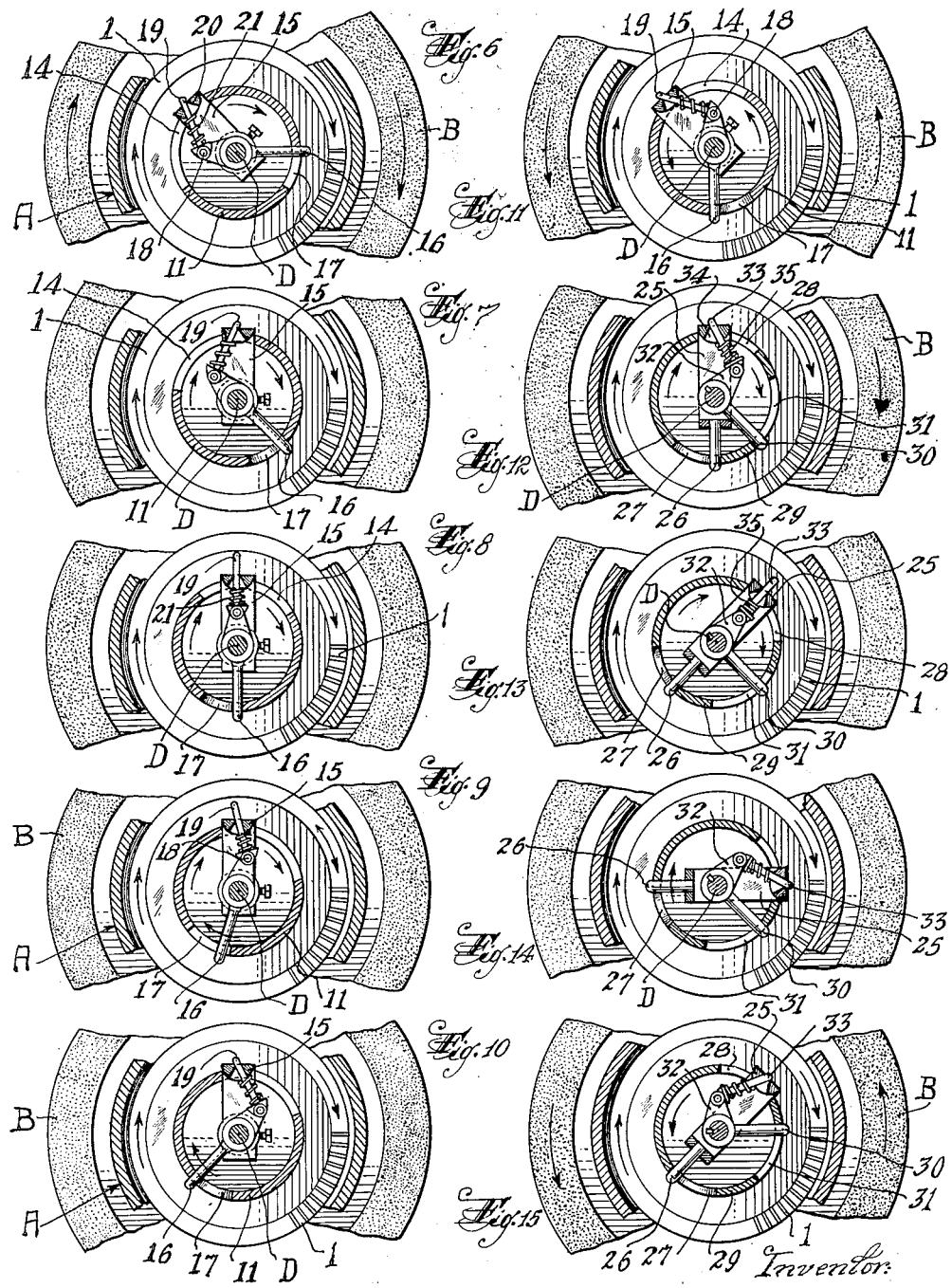

Nov. 25, 1952     E. O. HORN     2,619,209
AUTOMATIC REVERSING CLUTCH
Filed Nov. 12, 1947     4 Sheets-Sheet 4
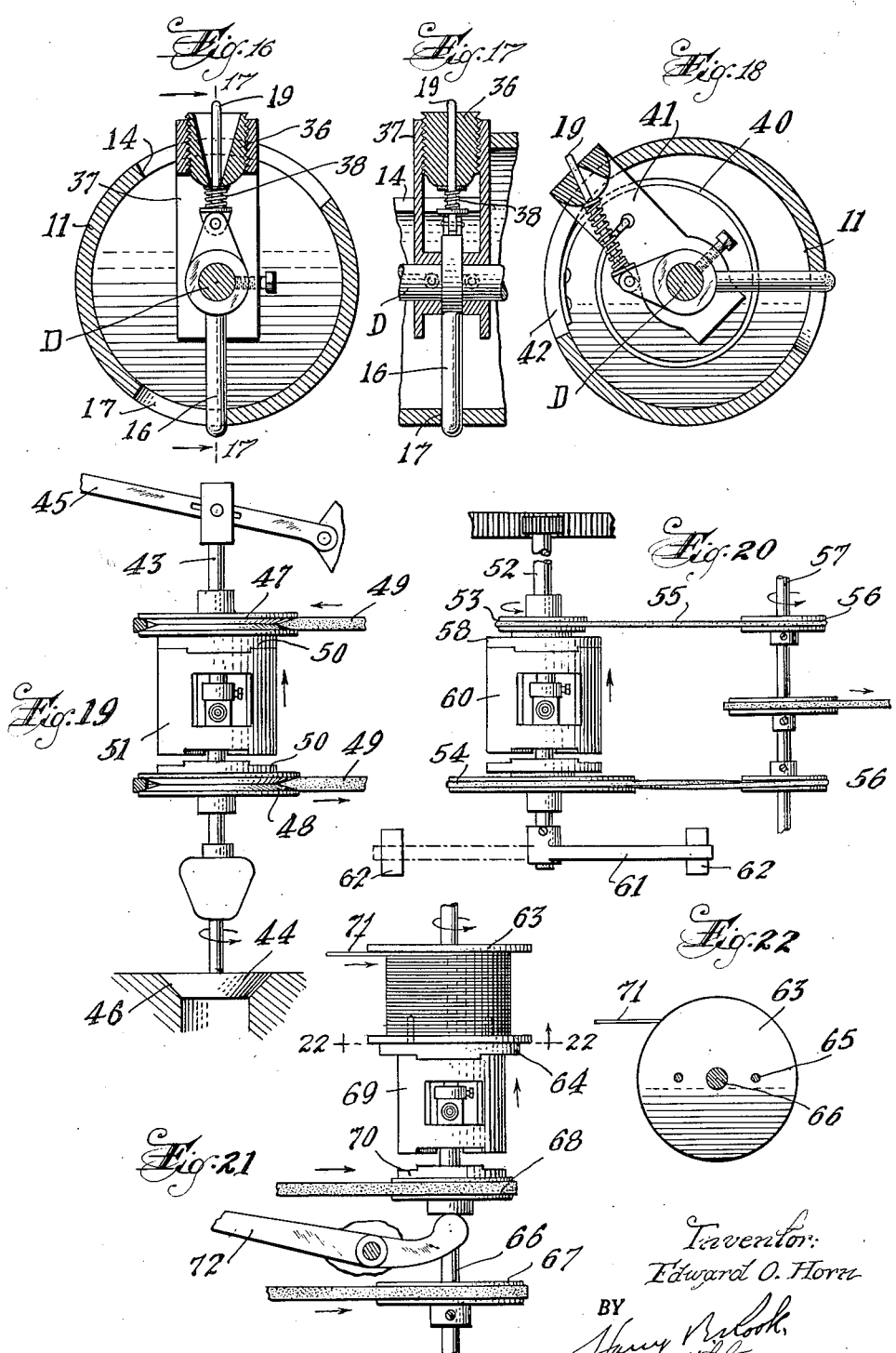

Patented Nov. 25, 1952

2,619,209

UNITED STATES PATENT OFFICE 2,619,209

AUTOMATIC REVERSING CLUTCH

Edward O. Horn, Glen Ridge, N. J.

Application November 12, 1947, Serial No. 785,343

6 Claims. (Cl. 192—51)

1

This invention relates in general to clutches, and more particularly to automatic reversing clutches, one object of the invention being to provide a clutch between a driving member and a driven member which will disengage or "throw out" or reverse the direction of movement of the driven member upon the application of a predetermined resistance to movement of said driven member.

The clutch embodying the invention may be used in connection with many different driving mechanisms, and another object of the invention is to provide a clutch which shall embody novel and improved features of construction whereby it may be utilized in mechanism for driving vacuum cleaners alternately in opposite directions at the will of the operator and by simple pulling or pushing motion upon the steering handle of the machine.

Other objects are to provide a clutch of the character described which shall embody a novel and improved construction and arrangement of parts that shall be simple and reliable in operation, and to obtain other advantages and results that will be brought out by the following description in conjunction with the accompanying drawings, in which Figure 1 is a top plan view of a vacuum cleaner embodying my automatic reversible clutch;

Figure 2 is a fragmentary vertical sectional view, approximately on the plane of the line 2—2 of Figure 3;

Figure 3 is an enlarged fragmentary top plan view of the vacuum cleaner and clutch mechanism, with portions broken away and portions of the clutch casing shown in section for clearness in illustration, showing the clutch engaged for forward movement of the machine and with the parts in the position assumed just prior to the shifting of the clutch to drive the machine rearwardly as shown in Figure 8;

Figure 4 is a fragmentary bottom view of the parts shown in Figure 3 with portions of the clutch casing shown in section;

Figure 5 is a transverse vertical sectional view, on the plane of the line 5—5 of Figure 2;

Figure 5a is a similar view, approximately on the plane of the line 5a—5a of Figure 2;

Figure 6 is a central transverse vertical sectional view through the clutch, showing the parts in the position for driving the vacuum cleaner forward;

Figure 1:
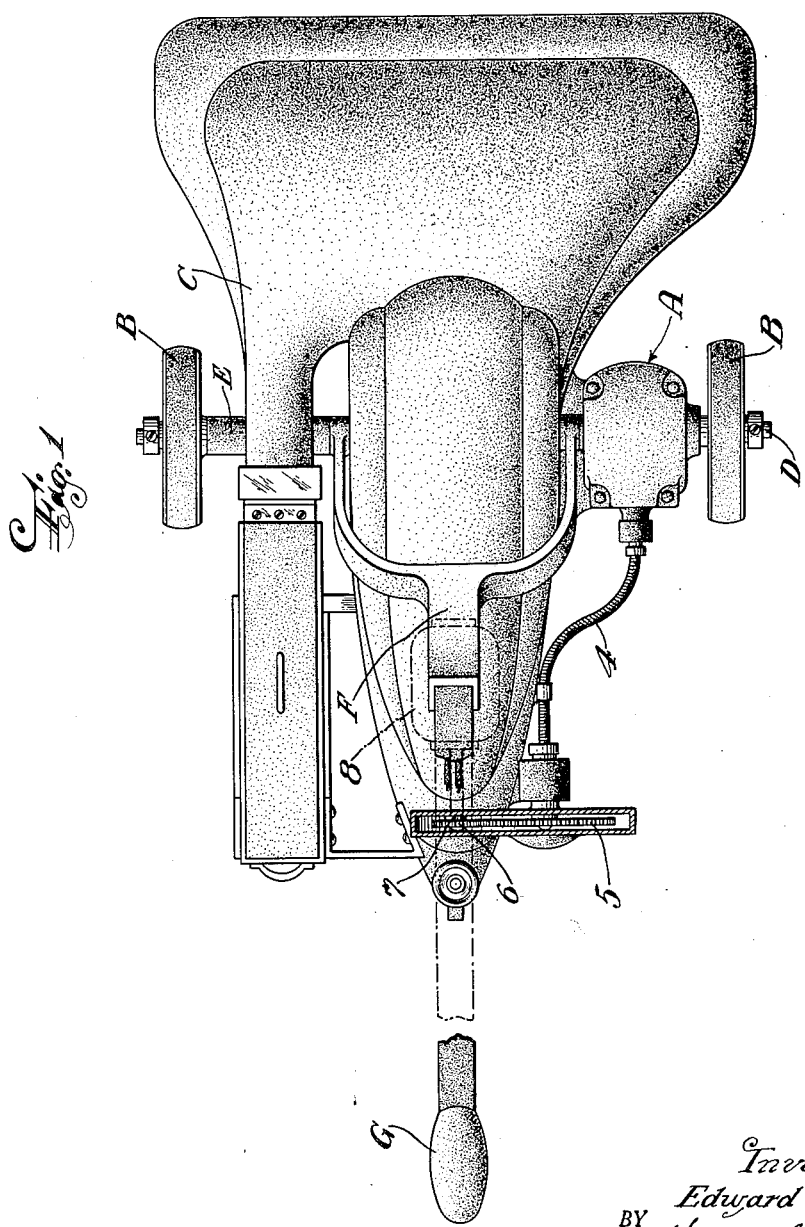

Figures 7-10, inclusive, are similar views, showing various intermediate positions of the clutch mechanism in its movement from one position to the reversed position;

2

Figure 11 is a view similar to Figure 6, showing the clutch in the opposite position for driving the machine rearwardly;

Figures 12-15, inclusive, are views similar to Figures 6-11, inclusive, showing a modification of the invention;

Figure 16 is an enlarged transverse vertical sectional view through the central clutch member, showing a modification of the invention;

Figure 17 is a longitudinal vertical sectional view, on the plane of the line 17—17 of Figure 16;

Figure 18 is a view similar to Figure 16, showing another modification;

Figure 19 is a schematic side elevational view of a modification of the invention, showing the clutch embodied in a valve grinding tool;

Figure 20 is a similar view, showing the clutch embodied in a variable speed driving mechanism;

Figure 21 is a top plan view of a further modification of the invention, illustrating the clutch in conjunction with a wire winding machine, and Figure 22 is a transverse vertical sectional view, approximately on the plane of the line 22—22 of Figure 21.

Specifically describing the embodiment of the invention illustrated in Figures 1-11, inclusive, the clutch mechanism generally designated A is shown in connection with mechanism for driving the wheels B of a vacuum cleaner C of generally known construction. The traction wheels B are keyed on the axle or shaft D that is journaled in suitable bearings E on the frame of the vacuum cleaner.

The vacuum cleaner may be manually pushed or pulled and steered by a control handle F which may be pivotally mounted on the axle D and has a hand grip G, portions of the handle being broken away for clearness in illustration.

For driving the traction wheels B, a pair of beveled gears 1 and 2 are shown freely rotatably mounted on the axle in spaced relation to each other and driven by a beveled pinion 3 which is connected by a flexible shaft 4 to a speed-reducing gearing that includes a gear 5 connected to the flexible shaft and meshing with a pinion 6 mounted on the shaft 7 of the electric motor 8 which drives the suction fan of the vacuum cleaner in known manner. With this construction, the two gears 1 and 2 will be driven continuously in opposite directions while the motor 8 is running, and the motor may be controlled by known mechanism such as a switch in the handle F.

Secured to or forming parts of the gears 1 and 2 are the respective clutch disks 9 and 10 with which cooperates a main or central clutch member 11 that is longitudinally slidably and relatively rotatably mounted on the axle or shaft D and has clutch faces 12 and 13 to cooperate respectively with the clutch disks 9 and 10, the clutch member and clutch disks being so related that normally the clutch member is engaged with one of the clutch disks 9 and disengaged from the other, as shown in Figure 3. The clutch member 11 is hollow and has a circumferential approximately rectangular slot 14 in its wall through which projects one end of a yoke 15, the other end of which is keyed or otherwise rigidly connected to the axle D. An actuating element 16 for the main clutch member 11 is pivotally connected intermediate its ends on the axle D and has one end slidable in a diagonal or oblique slot 17 in the wall of the main clutch member approximately diametrically opposite the rectangular slot 14. The other end of the element 16 is pivotally connected at 18 to one end of a rod 19 the other end of which is slidable in a hole 20 in the outer end of the yoke 15. Interposed between said end of the yoke and the element 16 is a compression spring 21, whereby the element 16 is held at one end or the other of the diagonal slot 17 in the main clutch member.

In operation, assuming the motor 8 to be running and the gears 1 and 2 rotating in clockwise and counterclockwise directions, respectively, as viewed in Figure 6, with the main clutch member 11 in engagement with the disk 9 on the gear 1, the axle D will be driven clockwise, as shown by the arrows in Figure 6, element 16 moving clockwise and through the pressure of spring 21 imparting clockwise motion to the yoke 15 which, being keyed to the axle, turns the latter and the traction wheels in clockwise direction. The vacuum cleaner will thus move forward, and should the traction wheels meet an obstruction, or should the operator exert a slight backward pull on the handle F, the traction wheels will be stopped, but the remainder of the driving mechanism will continue to move in a clockwise direction, as shown in Figure 7. This action results in a compressing of the spring 21, as shown in Figure 8, and a swinging of the yoke and actuating element 16 so as to move the pivot therebetween past dead center, as shown in Figures 8 and 9, whereupon the spring, with a snap action, will move the actuating element 16 to the other end of the diagonal slot 17, as shown in Figure 10, and thus slide the main clutch member 11 on the axle out of engagement with the clutch disk 9 and into engagement with the clutch disk 10 on the gear 2. This will cause the traction wheels to be driven by the gear 2 in the direction to move the vacuum cleaner backwardly, as shown in Figure 11. Then, should the operator push forwardly on the handle or should the traction wheels meet an obstruction while the machine is moving rearwardly, an operation of said actuating element 16 and yoke 15 similar but in the reverse direction to that above described will take place and the actuating element 16 will slide the clutch member 11 into engagement with the forward driving clutch disk 9 and the clutch elements will again be in the position shown in Figure 6.

It will thus be seen that the clutch will automatically reverse at the will of the operator upon exertion of a push on the handle in the desired direction of movement of the machine, i. e., forwardly or backwardly, and after each such manual push the machine will be power driven in the direction of the push. Also, when the machine is moving forwardly or rearwardly and strikes an obstruction such as to momentarily resist or stop rotation of the axle D, the clutch will automatically operate to cause the machine to move rearwardly or forwardly, respectively.

A modification of the invention is shown in Figures 12-15, inclusive, where the yoke 25 is rotatable relatively to the axle D and has one end 26 slidable in the angular slot 27 that corresponds to the slot 17. One end of the yoke extends through a slot 28 in the central clutch member 29, while an arm 30 keyed on the axle D extends through the rectangular slot 31 corresponding to the slot 14. The arm 30 has an extension 32 which is pivotally connected to one end of a rod 33 which slides through an opening 34 in the yoke 25. A spring 35 corresponding to the spring 21 is interposed between the yoke and the extension 32 of the arm 30. Figure 12 corresponds to Figure 6 in the location and operation of the parts, while Figure 13 shows the traction wheel B as having met resistance, stopped, and arm 30 compressing spring 35. Figure 14 shows the pivotal connection between the extension 32 of the arm 30, and the rod 33 as having passed the dead center point, as shown in Figure 10, while Figure 15 shows the position of the clutch parts reversed from that shown in Figure 12 for driving the traction wheel in counterclockwise direction.

While Figure 6 through Figure 15, inclusive, show certain details of construction, it is understood that these details could be modified to accomplish the same effect. For example, the extension 32 in Figure 12 and 18 in Figure 6, instead of operating on a pivot, could be a cam, substantially of the shape shown for extension 32, operating against a roller and spring mounted for radial movement in the yoke 25, Figure 12, or in the yoke 15, Figure 6.

Inasmuch as the tensions of the springs 21 and 35 determine the resistance point at which the clutch will reverse itself, it may be desirable to provide for adjustment of said spring tensions, for example, as shown in Figure 16, where an adjustable seat 36 may be screw threaded in the end of the yoke 37 for adjusting the tensions of the spring 38, or, if desired, seat 36 could be removed from the yoke 37, and a spring of different tension could be put in place of the spring 38.

Sometimes it may be necessary to provide different spring resistance to movements of the parts in opposite directions, respectively. For instance, in a vacuum cleaner having a brush, the motion of the brush against a rug may be such that it tends to move the vacuum cleaner forward, in which case it would be desirable to have the clutch provide greater driving power on the traction wheels in the backward direction than in the forward direction. This may be effected by the introduction of a spring 40 between the main clutch member and the yoke or other member 41 that operates in the rectangular slot 42 in the main clutch member.

In addition to the utilization of my invention in the vacuum cleaner drive mechanism, it may be used in many other places. For example, as shown in Figure 19, the clutch may be embodied in a valve grinding mechanism which is schematically illustrated and includes a shaft 43 having a valve grinding element 44 connected to one end and a lever 45 connected to its other end for varying the pressure of the grinding element on the valve seat 46. Pulleys 47 and 48 driven in opposite directions by belts 49 correspond to the gears 1 and 2 hereinbefore described, and they have clutch faces 50 to cooperate with the main clutch member 51 in the same manner in which the central clutch member 11 cooperates with the clutch faces 9 and 10. The main clutch member is actuated into and out of engagement with the clutch faces by the same mechanism that operates the clutch member 11. It will be understood that the parts will be mounted on a suitable frame (not shown), and that the shaft 43 will have a splined relationship to the other parts so that it may move longitudinally independently of the clutch mechanism. In operation, with the shaft 43 being driven in one direction, as shown in the drawing, increased pressure of the valve grinding tool 44 on the seat 46 will produce sufficient resistance to rotation of the shaft to cause a shifting of the main clutch member 51 and thereby reversal of the direction of rotation of the shaft.

In Figure 20 is shown a variable speed drive that includes a driven shaft 52 corresponding to the axle D and having pulleys 53 and 54 freely rotatable thereon and driven by belts 55 from pulleys 56 on a drive shaft 57. These pulleys have clutch disks 58 connected thereto with which cooperate a main clutch member 60 corresponding to the clutch member 11. The shaft 52 has an arm 61 which is rotated with the shaft, and at any points desired, stops 62 may be set to limit movement of said arm. Thus, when the main clutch member 60 is engaged with one of the clutch disks, the shaft will be rotated in one direction at one speed, while when the main clutch member is engaged with the other clutch disk, the shaft will be rotated in the opposite direction at a different speed. When the shaft is rotating in one direction and the arm 61 engages one of the stops 62, the resistance to movement of the shaft 52 will cause a shifting of the main clutch member to reverse the direction of rotation of the shaft, and when the arm 61 strikes the other stop member, the direction of rotation will again be reversed. It will be understood by those skilled in the art that such mechanism might be used, for example, on a reciprocating transfer mechanism such as the mechanism moving the work on a punch press, or in an automatic packaging machine wherein an arm driven by the shaft 52 in one direction at slow speed picks up and moves a piece to be packaged, and the arm returns at high speed to pick up another piece.

In Figure 21, the invention is shown as embodied in a wire winding mechanism in such a way that when more than a predetermined resistance to winding is met, such as binding or jamming in the machine, instead of the wire or thread breaking, the spring in the main clutch member 11 will be compressed and the clutch will be thrown out or disengaged, thus stopping the winding process. As shown, a winding reel 63 is rigidly connected to a clutch disk 64 as by pins 65, said clutch disk being freely rotatable on the winding shaft 66 which also has a driving pulley 67 keyed thereon and a starting pulley 68 freely rotatable thereon and driven in the same direction as and at a slightly greater speed than the pulley 67. The main clutch member 69 corresponding to the clutch member 11 has at its ends clutch faces that cooperate respectively with the clutch disk 64 and a clutch disk 70 carried by the starting pulley 68.

In normal operation, the main clutch member 69 is held by the actuating element 16 in the diagonal slot, in engagement with the clutch disk 64 so as to wind wire or the like 71 on the reel 63. Should unusual resistance to winding of the wire occur, for example, by binding in the machine, said resistance will tend to stop the clutch disk 64 and the main clutch member 69 while the main winding shaft 66 continues to rotate. This causes actuation of the member 16 in the diagonal slot in the main clutch member, so that the latter is thrown out of engagement with the clutch disk 64 and the rotation of the reel 63 is stopped. The main clutch member 69 and the disk 70 on the starting pulley 68 are normally spaced apart sufficiently to prevent immediate engagement of the main clutch member with said disk when the former is thrown out of engagement with the disk 64.

After the cause of the clutch disengagement has been removed and it is desired to restart the winding operation, the operator simply moves the clutch disk 70 into engagement with the clutch member 69 by any suitable means, such as a hand lever 72, and inasmuch as the starting pulley rotates at a slightly greater speed than the winding shaft 66, the clutch member 69 will be rotated in such a manner that the actuating element 16 of the clutch will be operated to throw the clutch member 69 again into engagement with the clutch disk 64 so as to start rotation of the reel 63. It will be observed that the starting pulley 68 and clutch disk 70 serve merely to momentarily rotate the clutch member 69 at a speed greater than that of the winding shaft 66 so as to cause the shifting mechanism to operate and engage the clutch member with the clutch disk 64, that shifting operation serving to disengage the clutch member 69 from the starting pulley clutch disk 70.

While I have shown and described several preferred embodiments of my invention in connection with various driving mechanisms and in certain details of construction, it should be understood that this is primarily for the purpose of illustrating the principles of the invention and that the details of construction and use of the automatic reversing clutch of the invention may be widely modified and changed within the spirit and scope thereof.

What I claim is:

1. A clutch comprising a shaft, a member rotatable and slidable longitudinally thereon and having a clutch face at each end to engage a complemental clutch element, a first clutch element and a second clutch element one adjacent each end of said member, a first element rigidly connected to said shaft to rotate therewith and operatively associated with said member for limited rotation relative thereto and to cause them to move together, a second element rotatable relatively to said shaft and operatively associated with said member to move it longitudinally in opposite directions upon rotation relative to said shaft in opposite directions respectively, and an operative connection providing force between said first and second elements to cause such rotation when there is more than a predetermined load between said member and said shaft.

2. The clutch as defined in claim 1 with the addition of means for placing the load on the first clutch element, means for driving said shaft, means for driving the second clutch element at a speed greater than the speed of the shaft and means for moving said driven clutch element momentarily into engagement with one of said clutch faces of said member to rotate said member at a speed greater than that of said shaft, thereby throwing said member back into engagement with the clutch element carrying the load.

3. An automatic reversing clutch comprising two driving elements coaxially rotatable in opposite directions, a coaxial driven element, and means to operatively connect said driven element to either of said driving elements, and mechanism operative upon relative rotation of said driven element and said means for actuating the latter to connect said driven element to one or other of said driving elements, said mechanism normally holding said means in position to connect said driven element to one of said driving elements for rotating said driven element in one direction, and said mechanism being actuated upon momentary rotation of said means in said direction at a speed greater than that of said driven element to connect said driven element to the other driving element, for rotation in the opposite direction, said driven element being a shaft, said means including a member relatively rotatably and longitudinally slidably mounted on said shaft into engagement with either of said driving elements and said mechanism comprising a first element rigidly connected to said shaft to rotate therewith and operatively associated with said member for limited movement relative thereto and to cause said shaft to rotate with said member, a second element rotatable on said shaft and operatively associated with said member to slide the latter into engagement with one of said driving elements upon rotation relative to said shaft in each of opposite directions respectively, and an operative connection between said elements to cause such rotation of the second element upon momentary rotation of said member at speed greater than that of said driven shaft, whereby to reverse the direction of rotation of said driven element.

4. An automatic reversing clutch comprising two driving elements coaxially rotatable in opposite directions, a coaxial driven element, and means to operatively connect said driven element to either of said driving elements, and mechanism operative upon relative rotation of said driven element and said means for actuating the latter to connect said driven element to one or the other of said driving elements, said mechanism normally holding said means in position to connect said driven element to one of said driving elements for rotating said driven element in one direction, and said mechanism being actuated upon momentary rotation of said means in said direction at a speed greater than that of said driven element to connect said driven element to the other driving element, for rotation in the opposite direction, said mechanism comprising a member movable into engagement with either of said driving elements, a first element rigidly connected to said driven element to rotate therewith and operatively associated with said member for limited movement relative thereto and to cause said driven element to rotate with said member, a second element rotatable relatively to said driven element and operatively associated with said member to move it into engagement with one of said driving elements upon rotation relative to said driven element in each of opposite directions respectively, and an operative connection between said first and second elements to cause such rotation of the second element upon momentary rotation of said member at speed greater than that of said driven element, whereby to reverse the direction of rotation of said driven element, said operative connection comprising a rod pivotally connected to said second element and longitudinally slidably connected to said first element and a compression spring on said rod and interposed between said first and second elements so that upon said momentary relative rotation said spring will rotate said second element to shift said member and reverse the direction of rotation of said driven element.

5. An automatic reversing clutch comprising two driving elements coaxially rotatable in opposite directions, a coaxial driven element, and means to operatively connect said driven element to either of said driving elements, and mechanism operative upon relative rotation of said driven element and said means for actuating the latter to connect said driven element to one or the other of said driving elements, said mechanism normally holding said means in position to connect said driven element to one of said driving elements for rotating said driven element in one direction and said mechanism is actuated upon momentary application of a predetermined resistance to rotation of said driven element, to connect said driven element to the other driving element for the opposite direction, said means including a member movable into engagement with either of said driving elements, and said mechanism comprising a first element rigidly connected to said driven element to rotate therewith and operatively associated with said member for limited movement relative thereto and to cause said driven element to rotate with said member, a second element rotatable relatively to said driven element and operatively associated with said member to move it into engagement with one of said driving elements upon rotation relative to said driven element in each of opposite directions respectively and an operative connection between said elements to cause such rotation of the second element when the driven element meets a predetermined resistance.

6. An automatic reversing clutch comprising two driving elements coaxially rotatable in opposite directions, a coaxial driven element, and means to operatively connect said driven element to either of said driving elements, and mechanism operative upon relative rotation of said driven element and said means for actuating the latter to connect said driven element to one or the other of said driving elements, said mechanism normally holding said means in position to connect said driven element to one of said driving elements for rotating said driven element in one direction and said mechanism is actuated upon momentary application of a predetermined resistance to rotation of said driven element, to connect said driven element to the other driving element for the opposite direction, said means including a member rotatable coaxially with said driving elements and to engage each of said driving elements upon longitudinal movement in opposite directions respectively, said member having on its circumference a rectangular diagonal slot in which said first element operates, and said mechanism includes a first element rigidly connected to said driven element to rotate therewith and extending through said rectangular diagonal slot for limited rotative movement relative to said member and to cause said driven element to move with said member when said second element engages the ends of said diagonal slot, a second element rotatable relatively to said driven element and extending into said diagonal slot so as to move said member into engagement with one of said driving elements upon rotation of said second element relative to said driven element in each of opposite directions respectively, and an operative connection providing a predetermined effective force between the first and second elements which causes the second element to remain at one end of the diagonal slot until the driven element meets with the predetermined resistance, at which time the first element moves against the resistance of the operative connection, past the point of greatest resistance, when the force of the operative connection acts against the second element to throw it to the opposite end of the diagonal slot, thus engaging said member with the driving element for movement in the opposite direction.

EDWARD O. HORN.

REFERENCES CITED

The following references are of record in the file of this patent:

UNITED STATES PATENTS

| Number | Name | Date |
| --- | --- | --- |
| 392,610 | Hoffman | Nov. 13, 1888 |
| 938,997 | Evans | Nov. 2, 1909 |
| 1,269,935 | Howard | June 18, 1918 |
| 1,458,334 | Gill | June 12, 1923 |
| 1,504,084 | Spencer | Aug. 4, 1924 |
| 1,641,392 | Lippert | Sept. 6, 1927 |
| 2,128,715 | Reich | Aug. 30, 1938 |
| 2,384,044 | Poorman | Sept. 4, 1945 |

FOREIGN PATENTS

| Number | Country | Date |
| --- | --- | --- |
| 84,675 | France | Nov. 8, 1917 |